May 20, 1952 E. P. TURNER 2,597,685
CLUTCH AND BRAKE FOR ELECTRIC TRANSMITTERS
Filed Sept. 13, 1946 3 Sheets-Sheet 1

Inventor
Edgar P. Turner
By William P. Stewart
Attorney

Witness:
N. Leszczak

May 20, 1952      E. P. TURNER      2,597,685
CLUTCH AND BRAKE FOR ELECTRIC TRANSMITTERS
Filed Sept. 13, 1946      3 Sheets-Sheet 2

Inventor
Edgar P. Turner

Witness:
N. Leszczak

By William P. Stewart
Attorney

May 20, 1952     E. P. TURNER     2,597,685
CLUTCH AND BRAKE FOR ELECTRIC TRANSMITTERS
Filed Sept. 13, 1946     3 Sheets-Sheet 3
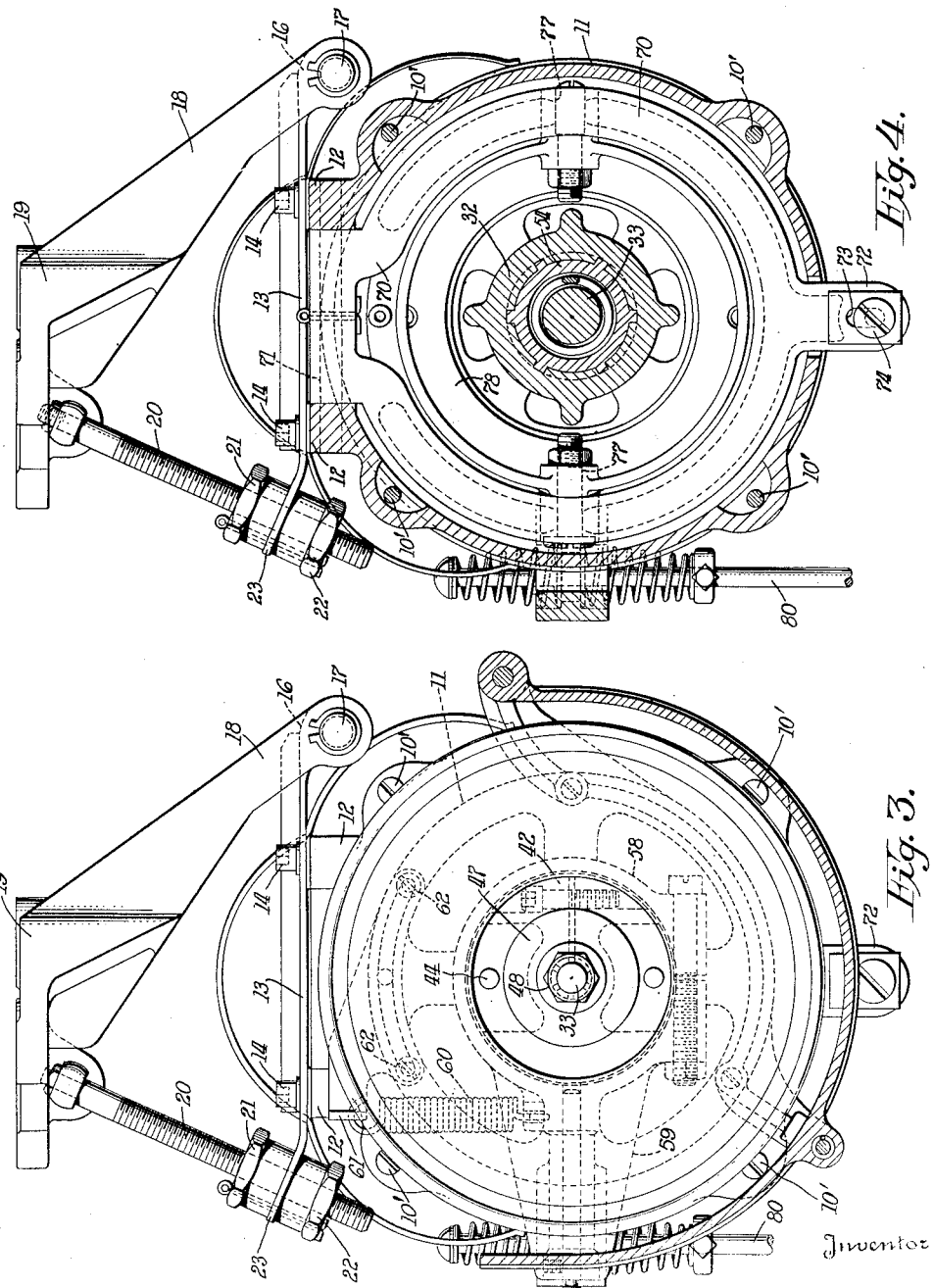
Inventor
Edgar P. Turner Patented May 20, 1952

2,597,685

UNITED STATES PATENT OFFICE 2,597,685

CLUTCH AND BRAKE FOR ELECTRIC TRANSMITTERS

Edgar P. Turner, Fanwood, N. J., assignor to The Singer Manufacturing Company, Elizabeth, N. J., a corporation of New Jersey Application September 13, 1946, Serial No. 696,828

4 Claims. (Cl. 192—14)

This invention relates to a unitary electric motor and power-transmitter device, commonly referred to in the trade as an electric transmitter, and adapted for use in garment manufacturing establishments as individual sewing machine drivers, each sewing machine having its own individual motor and transmission unit which is under control of the sewing machine operator.

One of the objects of this invention is to provide an improved motor and power transmitter which is compact, has a very low overall length, is inexpensive to make and of a simple design, and which stores dynamic energy in the rotor of the motor instead of the conventional flywheel.

Another object of this invention is to insure quick operation of the device without shock or vibration of the parts, and to this end the driven element of the clutch is insulated from its shaft to absorb the shock of sudden starts and stops and to overcome oscillatory effects of a destructive character.

A further object of this invention is the provision of improved means for quickly and readily attaching the driving pulley to its shaft and in the provision of novel means for holding the pulley against lateral movement relative to the driven shaft.

A still further object of this invention is to provide an improved means for shifting the driven element of the clutch into engagement with either the driving clutch element or into engagement with the brake.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings,

Fig. 3 is a sectional view taken along the line 3—3 of Fig. 1.

Fig. 4 is a sectional view taken along the line 4—4 of Fig. 1.

Figure 1:
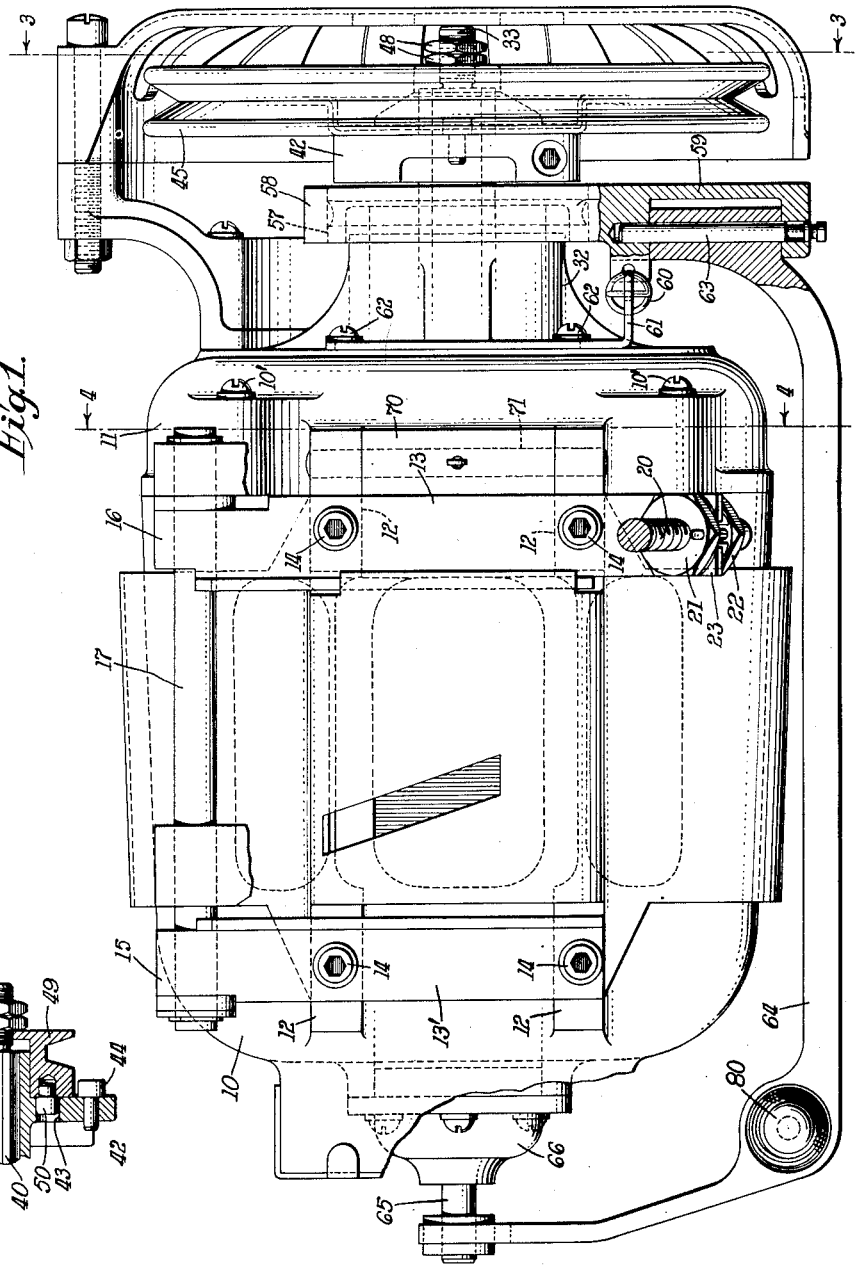
Fig. 1 is a side elevation, partly in section, of a transmitter embodying my invention.

In the embodiment selected for illustration, the casing of the transmitter is formed in two parts 10 and 11 which are held together by the screws 10' to form a hollow substantially cylindrical casing or frame. The part 10 is formed with lugs 12 to which bars 13 and 13' are screwed by the bolts 14. The ends of the bars 13 and 13' are formed with sockets 15 and 16 which receive a pivot shaft 17 carried by the free ends of the arms 18 formed on a bracket 19 (Figs. 3 and 4) which is adapted to be secured to the underside of the usual sewing machine industrial type table. Also carried by the bracket 19 is a screw 20 provided with the nuts 21 and 22 located on opposite sides of the extending end 23 of thhe bar 13. From the above, it will be obvious that the transmitter may be adjusted relative to its support by adjustment of the nuts 21 and 22.

The part 10 is formed with an inwardly extending central tubular portion 23 on which is tightly fitted a stationary electro-magnetic element 24 having the usual four-pole three-phase winding 25. The rotary electro-magnetic element is disposed externally of the stationary member 24 and comprises a ring type squirrel-cage rotor 26 secured to a die-cast spider 27 having a hub 28 splined to one end of a shaft 29 which is journaled in bearings 30 and 30' located interiorly of the tubular portion 23.

The spider 27 has secured to it a driving friction disk 28' which is held in position in a suitable depression on the face of the spider by a split ring 29'. The external rotor together with its spider are, in effect, a flywheel which acts as the driving element of the clutch.

Journaled in the bearings 31 and 31' carried by the hub 32 of the frame part 11, is a shaft 33 which has secured to its inboard end the driven element 34 of the clutch. In order to avoid shock, noise and vibrations of a destructive nature, the driven element 34 is secured to the shaft 33 by means of live rubber 35 which is bonded to the inner surface of the bore 36 in the driven element and the outer surface of the shaft 33. In order to limit the movement of the driven element 34 relative to the shaft, a pin 37 is forced through a diametral hole in the shaft with its ends protruding into the enlarged apertures 38 formed in the hub of the driven element. This mounting of the driven element on the driven shaft not only absorbs noise and vibration but provides, in effect, a universal mounting for the driven element and also absorbs the shock of sudden starting and stopping of the driven shaft.

Figure 5:
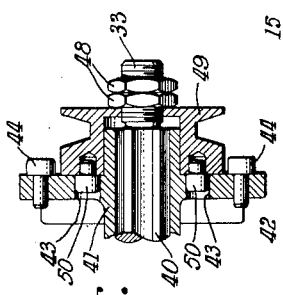
Fig. 5 is a sectional detail view of the means for securing a small pulley to the driven shaft of the transmitter.
Figure 2:
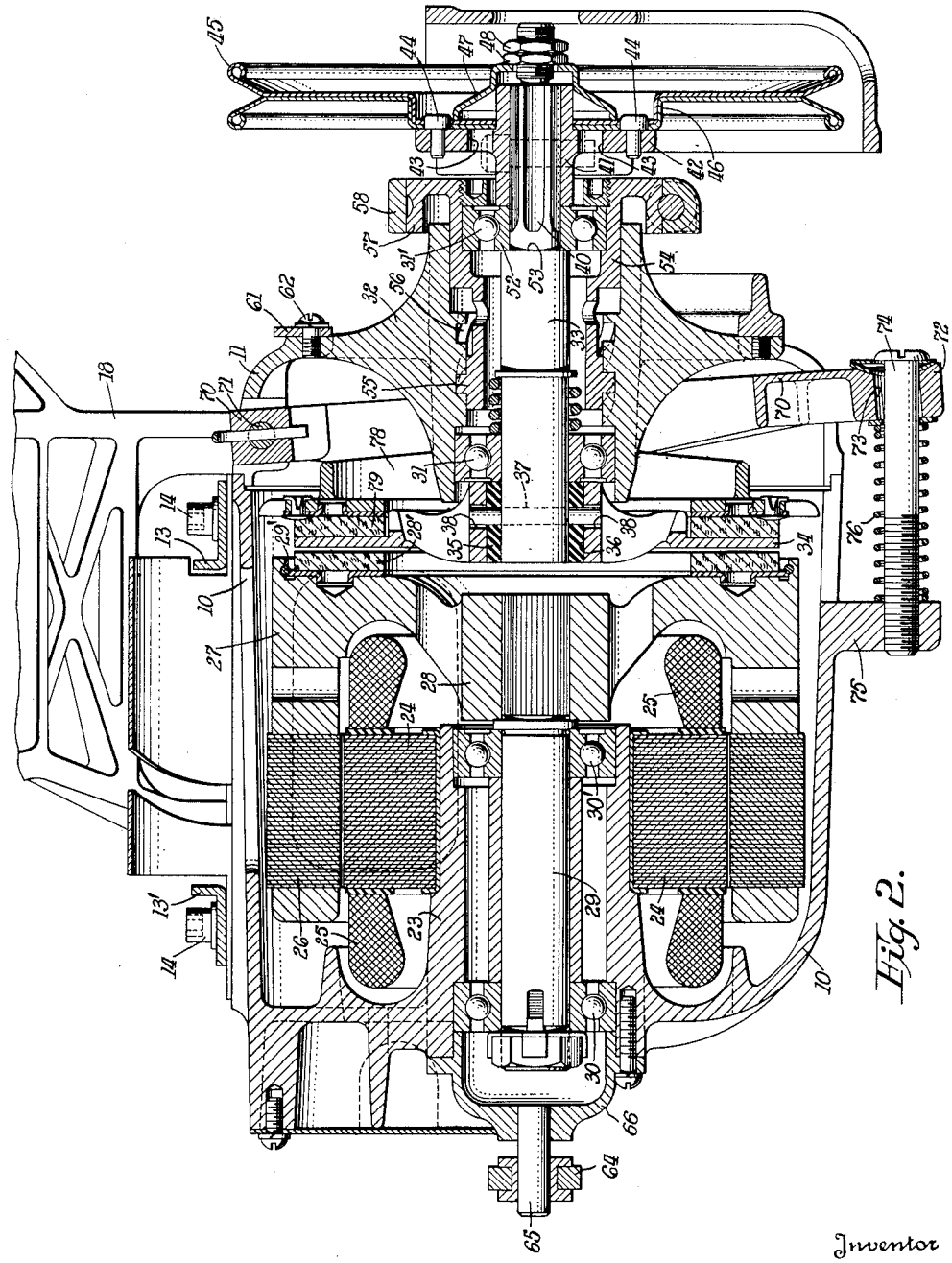
Fig. 2 is a vertical section taken through the center of the transmitter shown in Fig. 1.

The outboard end 40 of the shaft is splined to receive a split hub 41 having a radially extending flange 42 which is transversely formed with apertures 43 located adjacent the hub 41 (Fig. 2). The flange is also provided with lugs 44 which are force-fitted into suitable holes in the flange. As shown in Figs. 1 and 2, a sheet metal pulley 45 is removably secured to the shaft 33. The pulley 45 has an offset hub portion 46 having a centrally arranged opening which receives the end of the hub 41 and is formed with apertures which receive the lugs 44. The hub portion 46 of the pulley 45 is held against the face of the flange and prevented from lateral movement by means of a dish-shaped circular washer 47 having its peripheral edge in engagement with the offset hub portion 46 and its central apertured portion secured to the end of the shaft 33 by the nuts 48. Because of the wide range of speed of the machines to be driven by the transmitter it sometimes becomes necessary to secure a very small pulley to the shaft 33. As shown in Fig. 5, the small pulley 49 is cast and is provided with lugs 50 which are adapted to enter the apertures 43 in the flange 42, the pulley 49 being held against displacement on the shaft by the nuts 48.

In order to shift the shaft 33 and driven element 34 endwise, the inner-race 52 of the ball bearing 31' is held against lateral displacement on the shaft 33 between a shoulder 53 on the shaft and the hub 41, and the outer race of the ball bearing 31' is secured to a sleeve 54 formed with a helical thread or rib 55 which fits into a complemental cam groove 56 formed in the inner surface of the hub 32. Surrounding the portion 57 of the sleeve 54, which extends beyond the end of the bearing hub 32, is the split hub 58 of an actuating lever 59 spring urged in a clockwise direction as viewed in Fig. 3, by a tension spring 60 having one of its ends connected to the lever 59 and its other end connected to an arm 61 secured by the screws 62 to the frame part 11. Secured at one end by the pin 63 to the lever 59 is an L-shaped arm 64 (Fig. 1) the other end of the arm being pivotally supported on a pivot pin 65 located in alignment with the shaft 33 and carried by a bell shaped cover plate 66 which is fixed to the part 10 of the frame.

The transmitter brake is located within the housing and comprises a ring 70 hinged at a point adjacent its outer periphery to the part 11 of the housing by the hinge-pin 71 (Figs. 2 and 4). Diametrically opposite the hinge-pin 71, the ring 70 is formed with a depending lug 72 having a slot 73 through which passes a screw 74 threaded into a lug 75 formed on the frame part 10. A compression spring 76 encircles the screw 74 with its ends reacting against the lugs 72 and 75 to maintain the lug 72 against the head of the screw 74. From the above, it will be understood that the ring 70 may be adjusted about the pivot pin 71 and towards and from the driven element by the screw 74. Pivotally secured upon diametrically opposed pivot pins 77 (Fig. 4) which are carried by the adjustable ring 70 is a second ring 78 partially nested within the first ring and which carries a friction brake-ring 79 which is adapted to be engaged by the driven element 34 of the clutch when the shaft 33 is moved endwise to its stopping position.

The operation of the device is as follows; assuming that current is supplied to the motor and the external rotor 26, 27 is rotating, when the L-shaped arm 64 is pulled downwardly by means of the rod 80, or any other suitable means, the arm 64, through the lever 59, causes the sleeve 54 to move in a counterclockwise direction, as shown in Figs. 3 and 4. The counterclockwise movement of the sleeve 54 through the action of the helical rib 55 and groove 56 causes the sleeve 54 to move to the left as viewed in Fig. 2 and this movement is imparted, through the deep grooved ball bearings 31', to the shaft 33, thereby shifting the driven element 34 of the clutch into engagement with the driving friction disk 28' carried by the inverted rotor of the motor. The axial motion of the sleeve 54 also causes the arm 59, pin 63 and lever 64 to move to the left; the lever 64 sliding axially along the pivot pin 65. When the arm 64 is pushed upwardly by the bar 80, the above described movements are reversed and the shaft 33 is moved to the right, as viewed in Fig. 2, and out of engagement with the driving disk 28' and into engagement with the braking disk 79, thereby bringing the shaft 33 to rest. The rubber insert 35 permits the driven element 34 to adapt itself to slight misalignments of the braking and driving surfaces and also permits a slight working movement in the event that the shafts 29 and 33 are not in perfect alignment. Further, the shock due to, or caused by, the sudden engagement of the driven element with the driving element or with the braking element is partially absorbed by the rubber, and in the event that the torsional strain on the rubber exceeds a certain amount, the pin and slot connections 37 and 38 will prevent shearing of the rubber 33. Also, the interposition of the rubber 35 between the shaft 33 and the driven element 34 acts to reduce noise and vibration, and provides an arrangement in which the driven element will readily adapt itself to minor defects in manufacture and thus insure a quiet and easy running transmitter free of noise and other oscillatory and vibratory effects of a destructive character.

Having thus set forth the nature of the invention, what I claim herein is:

1. In an electric transmitter having a casing, an electric motor located in one end of the casing, a driving element actuated by said motor, a hub formed on the frame and located in the end of the casing opposite the motor, a driven shaft journaled in and mounted for endwise movement in said hub, a driven element mounted in said casing and secured to said shaft, and a brake laterally spaced from said driving element, the improvement which consists in means for shifting said driven shaft endwise to cause the driven element to engage either the brake or driving element by means of a U-shaped lever system which comprises, a lever movable longitudinally of said frame and angularly about the axis of the driven shaft, and an L-shaped arm having one limb pivotally secured to the frame of the transmitter at a point coincident with the axis of the driven shaft for longitudinal and pivotal movement with respect to said frame and its other limb connected to said lever.

2. In a motor-clutch driving device having, a driving element, a brake, a driven element disposed between said brake and driving element and a shaft carrying said driven element, the improvement which consists in a lever movable about the axis of said shaft for shrifting said shaft endwise to cause said driven element to engage either the driving element or the brake, and an L-shaped arm having one of its limbs pivoted for angular and longitudinal movement about the axis of said shaft and its other limb pivoted to said lever.

3. In a motor-clutch driving device having a frame, a driving element located in said frame, a brake also located in said frame and spaced from said driving element, a driven element disposed between said brake and driving element, a shaft journaled in said frame and carrying said driven element, the improvement which consists in mechanism for shifting said shaft endwise comprising a lever carried by said frame and movable both angularly and longitudinally relative thereto and an L-shaped arm having the end of one limb pivoted to said lever and the end of the other limb secured to said frame for both pivotal and longitudinal movement relative to said frame.

4. In a motor-clutch driving device having a frame, a driving element located in said frame, a supporting ring pivotally attached to said frame at one point and adjustably attached to said frame at a point diametrically opposite said first point, a brake pivotally attached to said supporting ring and spaced from said driving element, a driven element disposed between said driving element and said brake, a shaft journaled in said frame and carrying said driven element, means for shifting said shaft endwise, said shifting means comprising a lever carried by said frame and movable both angularly and longitudinally relative thereto and an L-shaped arm having the end of one limb pivoted to said lever and the end of the other limb secured to said frame for both pivotal and longitudinal movement relative to said frame so that no binding stresses are transmitted to said clutch or brake from said L-shaped lever.

EDGAR P. TURNER.

REFERENCES CITED

The following references are of record in the file of this patent:

UNITED STATES PATENTS

| Number | Name | Date |
|---|---|---|
| 1,166,408 | Blood | Dec. 28, 1915 |
| 1,896,968 | Paton | Feb. 7, 1933 |
| 1,963,364 | Hazetton | June 19, 1934 |
| 2,065,601 | Meyer | Dec. 21, 1936 |
| 2,226,727 | Kroes | Dec. 31, 1940 |
| 2,263,156 | Abel | Nov. 18, 1941 |
| 2,269,788 | Schenk | Jan. 13, 1942 |
| 2,386,017 | Venditty | Oct. 2, 1945 |
| 2,546,393 | Hale | Mar. 27, 1951 |

FOREIGN PATENTS

| Number | Country | Date |
|---|---|---|
| 134,695 | Germany | Sept. 30, 1902 |